Oct. 28, 1958 B. E. WHEELER 2,857,885
GOVERNOR
Filed March 19, 1956 5 Sheets-Sheet 1
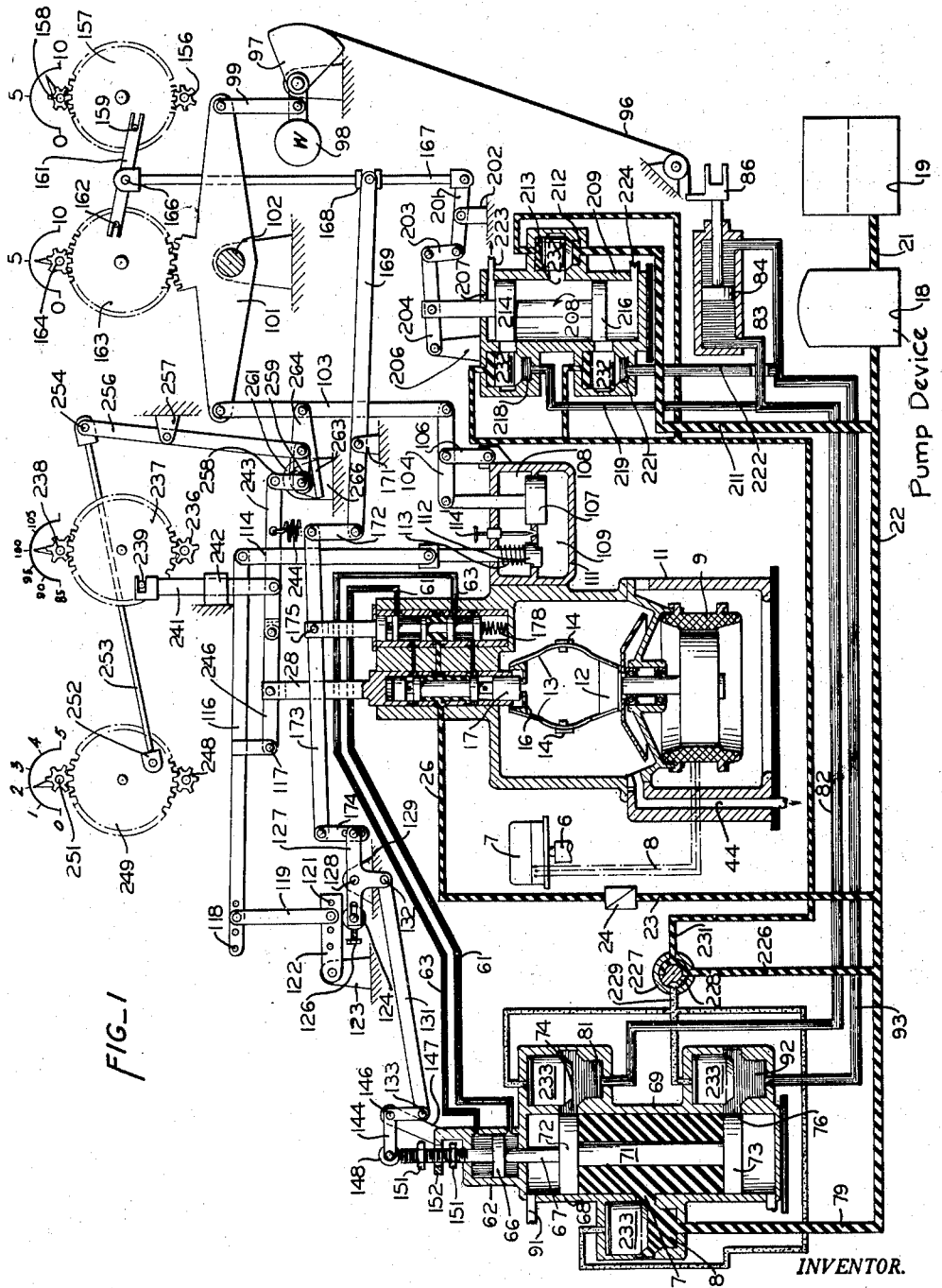
INVENTOR.
BYRON E. WHEELER
BY Lothrop y West
ATTORNEYS Oct. 28, 1958     B. E. WHEELER     2,857,885
GOVERNOR
Filed March 19, 1956     5 Sheets-Sheet 2
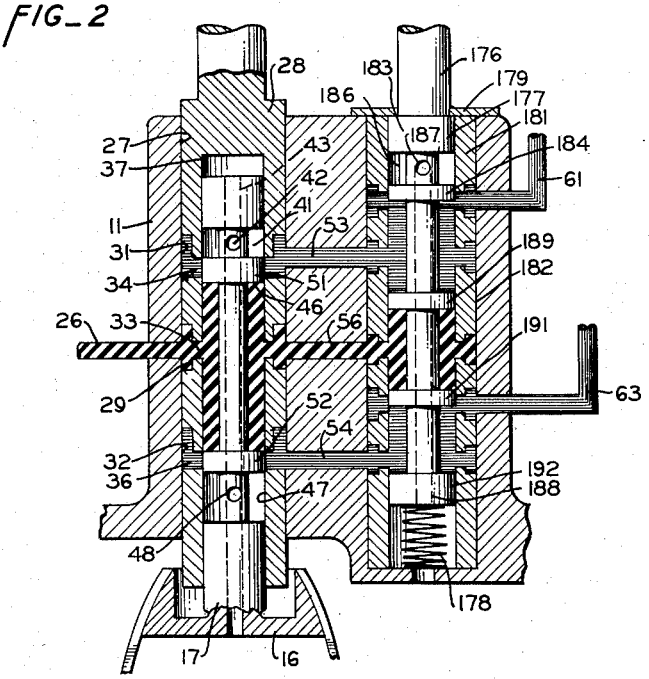
FIG_2
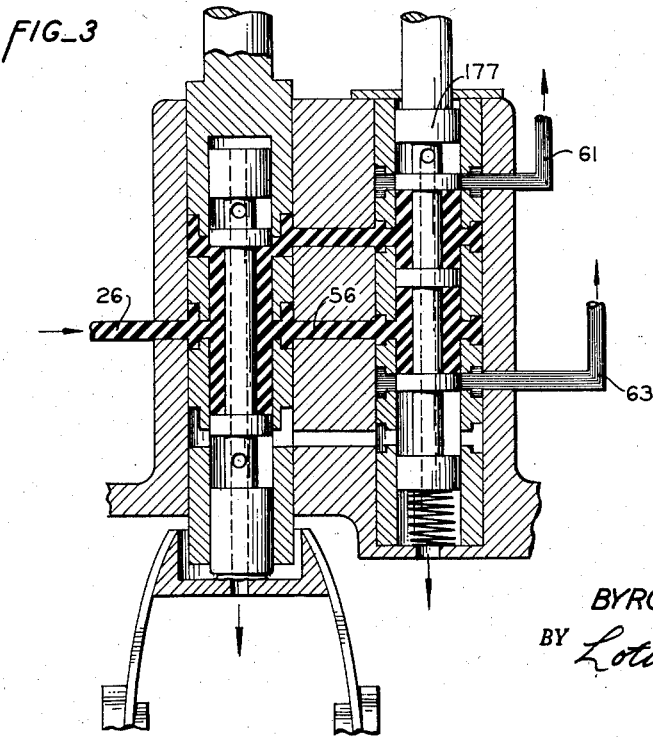
FIG_3
INVENTOR.
BYRON E. WHEELER
BY Lothrop & West
ATTORNEYS

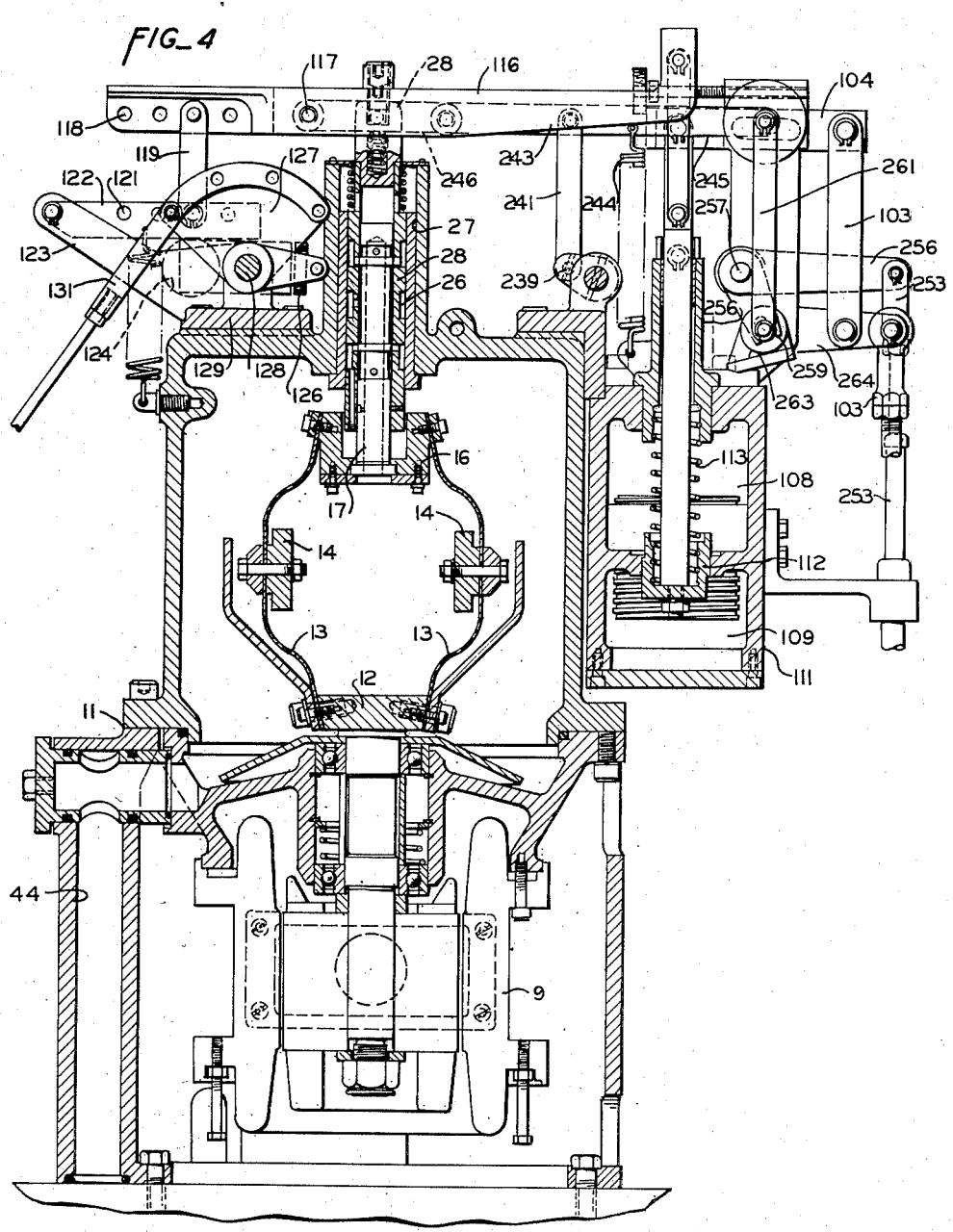

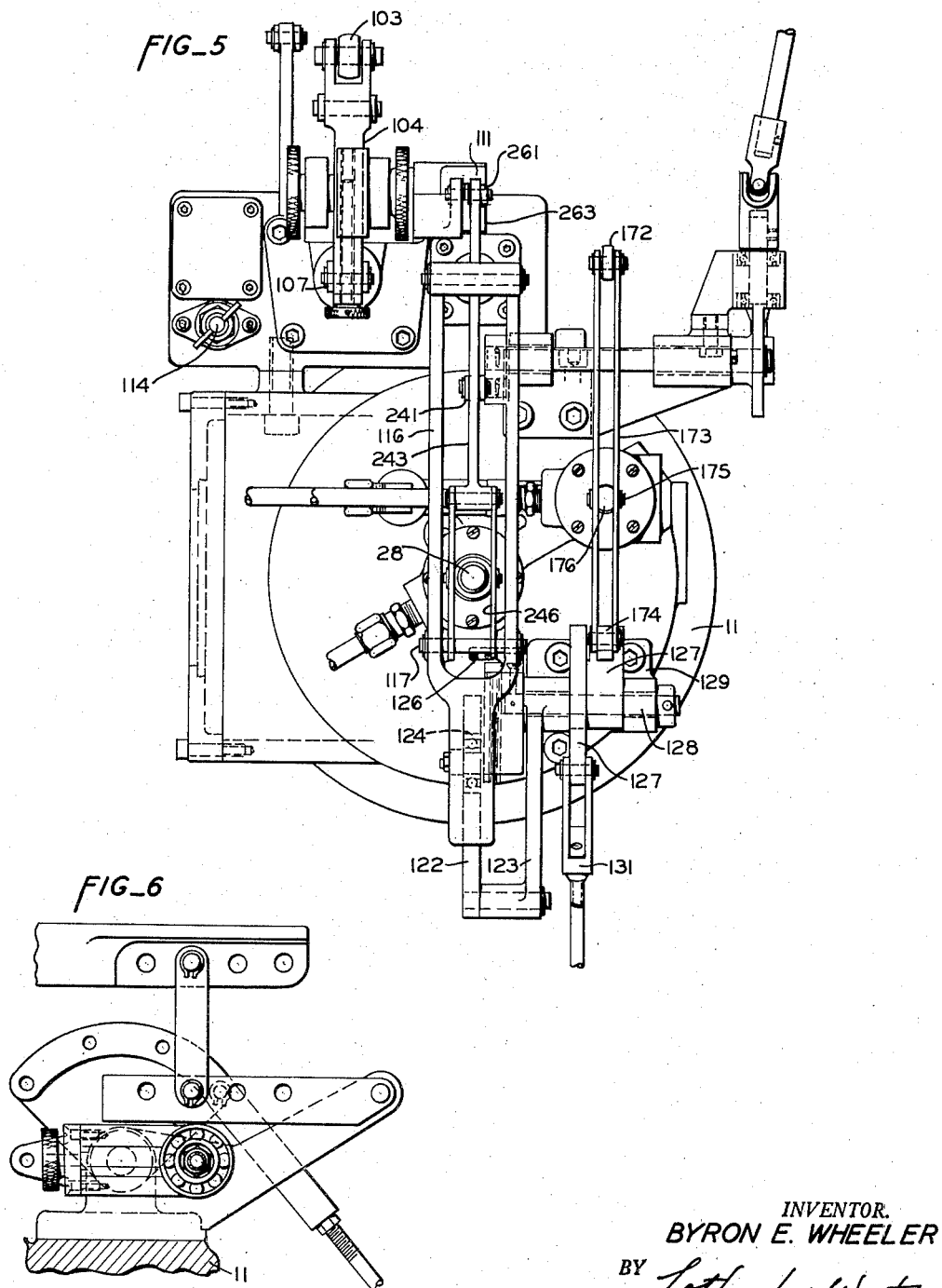

Oct. 28, 1958  B. E. WHEELER  2,857,885
GOVERNOR
Filed March 19, 1956  5 Sheets-Sheet 5
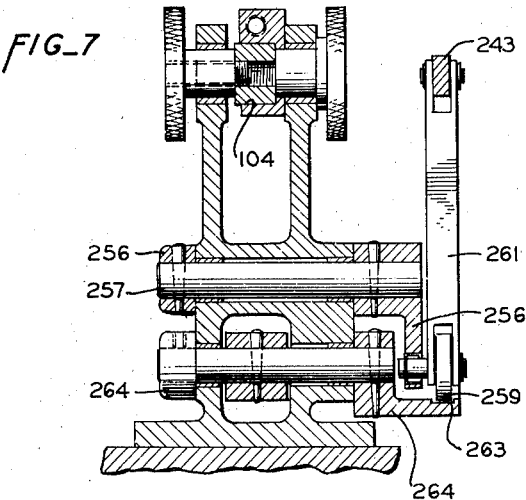
FIG_7
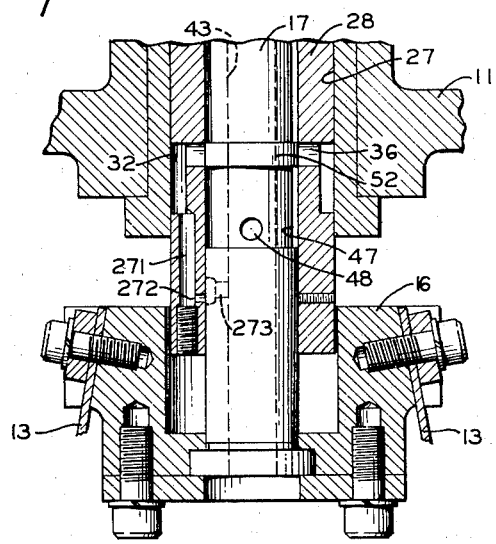
FIG_8
INVENTOR.
BYRON E. WHEELER
BY Lothrop & West
ATTORNEYS

United States Patent Office 2,857,885
Patented Oct. 28, 1958

2,857,885

GOVERNOR

Byron E. Wheeler, San Francisco, Calif., assignor to Baldwin-Lima-Hamilton Corporation, a corporation of Pennsylvania Application March 19, 1956, Serial No. 572,557

5 Claims. (Cl. 121—42)

My invention relates primarily to control mechanism especially useful in governing large hydraulic turbines, although it is not limited to that use. It is of the general nature disclosed in Patent 2,707,938 issued May 10, 1955, and assigned to the assignee of the present application. In the control of hydraulically driven turbines it is essential, particularly when such turbines are utilized to drive electrical generators, that the speed with variable load be carefully regulated. Additionally, in many installations the utilization of the water must likewise be carefully regulated for various reasons.

It is therefore an object of my invention to provide a governor which maintains with a very high degree of accuracy the desired speed characteristics of the governed mechanism and also can readily be regulated with respect to water control as evidenced by gate opening.

Another object of the invention is to provide a governor in which certain manual controlling functions, such as gate opening can be made to take precedence over some of the speed control functions.

Another object of the invention is to provide a governor of the sort shown in the mentioned patent but of an improved nature.

A still further object of the invention is, in general, to improve governors for fluid machinery.

Other objects, together with the foregoing, are attained in the embodiment of the invention described in the accompanying description and illustrated in the accompanying drawings, in which:

Figure 1 is a diagram, with many parts in cross section, of a governor constructed in accordance with the invention.

Figure 2 is a cross sction to an enlarged scale of part of the governor head structure including a diagrammatic showing of the speed pilot valve and the manual pilot valve.

Figure 3 is a view similar to Figure 2 but showing diagrammatically the movable parts in different relationship.

Figure 4 is a cross section, with some parts in elevation, of a governor head structure as actually built.

Figure 5 is a plan of the structure of Figure 4.

Figure 6 is a side elevation (from the side opposite Figure 4) of part of the governor head mechanism.

Figure 7 is an elevation and partial cross section of part of the speed droop mechanism.

Figure 8 is a detail in cross section of part of the hydraulic circuit adjacent the governor speed pilot valve.

The installation of the governor is often in connection with a rotating mechanism such as a hydraulically driven turbine actuating an electrical generator and it is characterized by the presence of a rotating shaft 6, the speed of which is to be carefully controlled. Pursuant to the usual installation, the shaft 6, drives an electrical generator 7 joined by conductors 8 to a driving motor 9 which operates at a fixed multiple of the speed of the shaft 6. The motor 9 is mounted in a governor casing 11 conveniently situated at a point remote from the shaft 6. The motor 9 operates a fly ball mechanism 12 including a pair of springs 13 on which fly ball weights 14 are disposed so that the lateral displacement of the weights upon rotation of the motor 9 is proportional to some function of the speed of the shaft 6. The lateral motion of the weights is effective to cause axial movement of a rotary disk 16 secured to and correspondingly driving a speed pilot valve core 17. By this means, the core 17 rotates about its axis in conjunction with the rotation of the motor 9 and is axially displaced in accordance with the lateral displacement of the fly ball weights 14. The core 17 is moved downwardly in the figures as the speed of the shaft 6 increases and moves up as the speed of the shaft 6 decreases.

Movement of the speed pilot valve core 7 is utilized through a servo mechanism to control the operation of the water wheel driving the shaft 6. Since the servo mechanism is conveniently of a hydraulic type, there is preferably provided a hydraulic pressure supplying device 18 which comprises essentially a pump device drawing hydraulic liquid from a tank 19 through a conduit 21 and having an outlet pipe 22 for liquid under pressure. A branch conduit 23 extends through a filter 24 to a duct 26 leading into the casing 11.

Within the casing 11 and intersected by the duct 26 is a first or primary bore 27 coaxial with the core 17 and accommodating a speed pilot valve sleeve 28. The sleeve has a central circumferential groove 29 turned around its periphery and likewise has an upper groove 31 and a lower groove 32 of similar conformation. All of the grooves 29, 31 and 32 are respectively provided with apertures 33, 34 and 36 leading to an interior chamber 37 formed within the sleeve 28 and opening through the lower end thereof. The chamber 37 is designed snugly to accommodate the core 17 which rotates therein, the rubbing surfaces being suitably conditioned for that purpose.

The core 17 is contoured to co-act with the apertures 33, 34 and 36 within the sleeve 28. The core has a top groove 41 cut entirely around it and opening through an aperture 42 into a drain passage 43. This extends through the entire length of the core and opens at its lower end into the hollow interior of the casing 11 from which a drain passage 44 leads back by a conduit (not shown) to the tank 19. The core 17 is likewise provided with a relatively long central groove 46 not connected to the drain passage 43 and is also contoured to provide a lower groove 47 opening through an aperture 48 into the drain passage 43. The position of the grooves 41, 46 and 47 is such that intermediate lands 51 and 52 are provided.

In an intermediate position of the core the lands block flow through the apertures 34 and 36. In this intermediate position, any leakage flows through the apertures 42 and 48 to drain and in this intermediate position of the core and in the illustrated position of the sleeve 28, flow is blocked into an upper communicating passage 53 in the casing 11 and is also blocked into a lower communicating passage 54 in the casing. However, because of the absence of any central land, flow from the aperture 33 continues into an intermediate passage 56.

The connection 56 extends eventually to a conduit 61 leading to the lower portion of the cylinder 62 of a hydraulic servo mechanism whereas the connection 54 extends eventually to a pipe 63 connected to the upper end of the servo cylinder 62. When the core 17 is in the position shown in Figure 2, there is no flow within either of the conduits 61 or 63 and no change in the servo cylinder 62 occurs. However, when the core moves upwardly, the land 52 in rising uncovers the aperture 36 so that the line 63 is then connected to drain and simultaneously the land 51 uncovers the aperture 34 so that through the lines 53 and 61 pressure fluid from the conduit 26 is introduced into the bottom of the servo cylinder 62. The resulting unbalance in pressure is effective on a piston 66 included in the hydraulic servo mechanism and movable within the cylinder 62 and fast on a rod 67 controlling the motion of a main valve, generally designated 68.

The main valve includes a casing 69 within which a valve body 71 is movable. The body 71 has a pair of lands 72 and 73 thereon which in an intermediate position of the member block body apertures 74 and 76. Between the lands 72 and 73 there is communication through an opening 77 with a valve chamber 78 supplied with pressure fluid by a pipe 79 extending from the conduit 22. Thus, in the position of the structure shown in Figure 1, pressure fluid is available within the main valve 68 but does not flow through either of the orifice 74 or 76. However, when there is an upward shift in the position of the valve core 17, as described, the pressure within the chamber underneath the piston 66 increases so that the valve body 71 is lifted. Pressure fluid then flows in from the orifice 77 through the opening 74 and from a chamber 81 in the valve body 68 into a line 82 extending to one end of a main or gate motor 83. A piston 84 within the main or gate motor 83 connects through a rod fastening 86 to the controlling gates (not shown) for the water wheel or turbine on the shaft 6. Thus, the movement of the main valve body 71 causes a corresponding movement, at least, of the gate piston 84 and the connector 86.

Comparably, when the valve core 17 descends from its position shown in Figure 2, the line 61 discharges to drain through the connection 53 whereas pressure fluid from the conduit 26 is admitted through the passage 54 into the line 63. This places an excess pressure upon the upper side of the servo piston 66 and forces the valve body 71 downwardly. In this position, the line 82 is connected through the chamber 81 to a drain line 91 extending back to the tank 19 and simultaneously the valve land 73 in descending connects the pressure line 79 through the chamber 78 to a chamber 92 associated with the orifice 76. From there the pressure is carried through a conduit 93 to the other end of the main or gate motor 83.

The result of this pressure shift is to move the main or gate motor piston 84 from right to left, as seen in Figure 1, and to shift the connector 86 correspondingly. Thus, when the fly ball weights on the governor move in or out, in accordance with speed variation of the shaft 6, there is a corresponding shift, axially up or down, of the core 17 and this, in turn, is effective hydraulically through the pilot servo 62 to move the main valve 71. The effect of the repositioned main valve is then to shift the position of the main gate motor piston 84 correspondingly so that there is ultimately produced at the turbine a change in the water flow thereto corresponding precisely with the change in speed as sensed by the governor fly balls 14. There is thus a direct response of the control instrumentality to the speed condition imposed by the shaft 6.

There is also a feed back arrangement so that this control mechanism is stable. For this reason, the connector 86 is joined by a cable 96 to actuate a lever 97 suitably mounted and having a tension maintaining counterbalance 98 thereon. This lever is joined by a link 99 to a beam 101 pivotally mounted on a fulcrum base 102 and connected by a link 103 to an adjustable dashpot lever 104. A link 106 supports the lever 104 in a position to actuate a dashpot piston 107. This piston is disposed between a pair of oil-containing chambers 108 and 109 in a dashpot casing 111. The movement of the piston 107 pursuant to the movement of the member 86 causes displacement of the oil within the chambers 108 and 109 and correspondingly displaces a piston 112 normally held in central position by a spring 113 fastened at both ends. The displacement of the piston 112 is not exactly proportionate to the displacement of the piston 107 since an adjustable needle valve 114' permits flow between the otherwise separated chambers 108 and 109. Eventually, the spring 113 restores the piston 112 to its central position from either direction of displacement, but momentary and approximately corresponding displacement of the piston 112 takes place whenever the piston 107 moves.

Movement of the piston 112 produces a corresponding motion in a link 114 secured to one end of a lever 116 mounted on a fulcrum pin 117. The other end of the lever 116 has a plurality of apertures 118 therein. In one of them, one end of a connecting link 119 is pivotally fastened. The other end of the connecting link 119 is suitably pivoted in any one of several apertures 121 in a rocker lever 122 mounted on a fulcrum base 123. Designed to abut the rocker lever 123 at any one of several radial locations is a roller 124 having an adjustment mounting 126 for holding it in any selected position. The mounting 126 is at one end of a T lever 127 supported by a pivot 128 on a fulcrum 129. Extending from the T lever 127 is a link 131 connected thereto by a pivot pin 132 and also connected by a pivot pin 133 to a bell crank 144. This latter turns on a pivot connection 146 to a bracket 147 upstanding from the valve casing 68. One end of the bell crank 144 carries a roller 148 which abuts the end of the rod 67 and is effective thereon. The range of movement of the stem 67 is limited by adjustable stop nuts 151 travelling either side of a stop bracket 152 on the housing 62.

The function of the mechanism is to "restore" or reposition the sleeve 28 when the stem 67 has been displaced by the servo motor 62 in response to a speed change impulse and when the main gate motor piston 84 has been displaced to a corresponding new position. When the stem 67 moves, the bell crank 144 shifts the link 131 and the T lever 127. This motion is transferred to the link 119 through the rocker lever 122. This, in turn imposes a related movement through the lever 116 which can momentarily be considered as pivoting about the pin at the end of the link 114. Movement of the lever 117 is effective upon the pin 117 and a lever 246 and so repositions the sleeve 28.

The initial movement of the stem 67, as described, produces a corresponding movement of the connector 86. As this latter movement is taking place, it is fed back through the connection 96 to the lever 97, from thence to the balance beam 101 and from there to the dashpot mechanism 111. A resulting impulse is then sent from the dashpot through the link 114 to the lever 116. This can momentarily be considered as pivoting about the pin in the appropriate aperture 118 and so moves the pin 117. The lever 246 transfers this motion to the sleeve 28 which is thus appropriately repositioned. This particular restoration is accomplished under the control of the dashpot mechanism 111 set so that the governor does not "hunt" excessively. While the two restoring motion trains (from the stem 67 and from the connector 86) have been separately described, they can and often do function at the same time.

In many installations, it is often the case that for various reasons the requirements of the speed governor cannot be met by further opening of the hydraulic gate connected to the fitting 86. For example, for water conservancy there may be established a maximum gate opening beyond which the mechanism 86 is not permitted to go. This is usually a large fraction of the total gate movement but, even so, constitutes an important and necessary limitation. The particular amount of maximum gate opening may change from time to time. There is consequently provided a means for manually changing the maximum gate opening setting in connection with the speed governor. While the governor normally maintains an unfettered speed control for load variations in both directions, there is imposed a limitation on the maximum gate opening. Under heavy load conditions the speed may then decrease, but if the load should be reduced the maximum speed still is not exceeded.

The maximum desired gate opening is preferably initially set manually by the operator. At a convenient point, there is provided a hand wheel 156 engaged with an operating disk 157 suitably actuating a gate limit or maximum permissible opening indicator 158. The disk 157 is likewise connected by a pin 159 to a whiffle tree 161, the other end of which is mounted on a pin 162 projecting from a position responsive disk 163. The latter disk indicates instantaneous gate position by means of an indicator 164 geared thereto. The movement of the whiffle tree 161 by the pin 159 (when the pin 162 is stationary) is effective through a pivot connection 166 to move a control rod 167.

Engaging a collar 168 on the rod 167 is one end of a transmitting lever 169 suitably provided with a fulcrum 171 and connected by a link 172 to a lever 173. The other end of the lever 173 is joined by a link 174 having a lost motion connection with the T lever 127. Intermediate its ends, the lever 173 is connected by a pivot 175 to the stem 176 (Figure 2) of a gate pilot valve spool 177. This spool is normally urged by a spring 178 upwardly against a stop 179 overlying one end of a liner 181 in a secondary or second bore 182 formed within the governor head casing 11.

The liner 181 has passages therein registering with the various conduits 53, 54 and 56 and also with the conductors 61 and 63. The spool 177 has various lands thereon including a pair of upper lands 183 and 184 defining a groove 186 having an aperture 187 therein leading through a central bore 188 to drain. The spool likewise has a pair of intermediate lands 189 and 191 and a lower land 192. In the position of the spool 177 shown in Figure 2, the spool does not obstruct free interflow between the governor pilot valve core 17 and the servo mechanism 62. However, in the position of the structure shown in Figure 3, the spool 177 has been moved downwardly by the linkage described to block flow between the governor pilot valve core and the servo mechanism 62.

Further downward movement of the spool 177 connects the conduit 61 through the groove 186 and the aperture 181 to drain and simultaneously connects the conduit 63 to the pressure fluid travelling from the conduit 26 and the intermediate passage 56. Thus pressure is relieved from the conduit 61 and the lower part of the servo chamber 62 below the piston 66 and is imposed upon the conduit 63 and within the chamber 62 above the piston 66. The effect is to move the main valve rod 71 downwardly so that pressure fluid from the conduit 79 flowing through the aperture 77 travels out through the chamber 92 into the pipe 93 and to the right end of the main gate motor 83 while simultaneously there is afforded a path to drain from the left end of the main gate motor through the conduit 82, the chamber 81, the aperture 74 and the conduit 91. Consequently, when the operator turns the control 156 to impose a lower limit upon the maximum permitted gate opening, the spool 177 supersedes the operation of the main governor speed pilot core 17 and is effective, disregarding the instantaneous position of the speed governor parts, to operate through the servo motor 62 so as to shift the main valve 68 and to cause the main gate motor 83 to impose a smaller opening on the turbine water controller; that is, the gates or needle nozzles are moved toward closed position in an amount so that they then occupy a new limit position.

While the lost motion connection 174 does not transmit a major feed back effect upon the motion of the servo piston 66, there is a feed back upon the gate limit valve spool 177 in that the corresponding motion of the connector 86 moves the lever 97 as before and simultaneously moves the beam 101. Since that beam is connected by gearing to the disk 163 and since the pin 162 is mounted on the disk 163, the same motion which produces a showing on the indicator 164 of the instantaneous gate position simultaneously displaces the whiffle tree 161 for the new position of the gates and restores the rod 167 to a position such that the valve spool 177 shifts back from its maximum displaced position to its neutral position as shown in Figure 2.

If desired, the arrangement is such that the gate position can be controlled manually rather than by speed. The motion is derived from the manually controlled rod 167 connected by a rocker 201 mounted on a suitable fulcrum 202 to a link 203. This, in turn, is joined to a lever 204 mounted on a fulcrum 206 on a valve casing 207. The motion of the lever 204 is transferred to a valve 208 operating in a valve housing 209. Pressure fluid from the line 22 is led through a conduit 211 into a chamber 212 opening through an aperture 213 into the space between lands 214 and 216 forming part of the valve 208. The land 214 controls flow into a chamber 218 connected by a pipe 219 to the pipe 82. The land 216 controls flow into a chamber 221 connected by a pipe 222 to the conduit 93.

When the hand valve 208 is displaced so that neither land blocks flow therefrom, it is effective, depending upon the direction of displacement, to divert pressure fluid from the pipe 211 into either the pipe 219 and the conduit 82 or the pipe 222 and the conduit 93. When one of the latter conduits is so connected to the pressure supply, the other conduit is then connected to drain since the chamber 209 at its opposite ends is provided with appropriate drain lines 223 and 224 leading back to the tank 19. Thus, as the rod 167 is moved, it correspondingly moves the hand valve 208 so that the connections to the main gate motor 83 cause a corresponding change in the position of the water wheel gate.

Means are provided for rendering either the valve 71 or the valve 208 alternatively effective. Pressure fluid from the line 22 is led through a conduit 226 to a selector valve 227 having a rotor 228 therein so that the pressure fluid can be diverted alternately into a pipe 229 or into a pipe 231 with the other pipe then being connected by suitable means (not shown) to drain into the storage tank 19. In the position of the transfer valve 227 shown in Figure 1, the pressure fluid is conducted by the pipe 231 to numerous branches each of which connects with one of the chambers 218, 221 and 212 but on the opposite side of piston poppet valves 232 therein. With pressure on the pistons, the poppet valves are seated so that there is no flow possible through the valve 208 and the manual motion thereof is ineffective. At this time, the pipe 229 connects through various branches with similar piston poppet valves 233 in the various chambers 78, 81 and 92 but on the opposite side of the pistons from the poppet thereon. These pistons and poppets are therefore open and the valve 71 is effective. When the selector valve 227 is reversed, pressure closes the valves 233 so that the valve 71 is no longer effective but simultaneously permits the valves 232 to open so that the hand valve 208 is then effective. In this fashion, either the automatic governor or the hand control is made alternatively effective upon the main gate motor 83.

There is also provided in connection with this governor mechanism a means for changing the speed at which the governor is effective. That is accomplished simply by a hand control 236 effective to rotate a disk 237 geared to an indicator 238 for showing the speed setting. On the disk 237 is a pin 239 engaged with a link 241 suitably held in a guide 242 and connected to a lever 243. One part of the lever 243 is held down by a suitably anchored spring 244 while the other end is pivotally joined to a lever 246 connected to the pivot pin 117. Intermediate its ends, the lever 246 is pivotally connected to the upper end of the stem 28 of the speed pilot valve sleeve 28. Thus, when the controller 236 is turned in either direction there is immediately afforded by the indicator 238 a showing of the new speed selected and also the link 241 moves the levers 243 and 246 so that the sleeve 28 is slightly shifted. This movement of the sleeve displaces it sufficiently from the core 17 so that there is a corresponding hydraulic flow to produce the corresponding movement of the main gate motor 83. There is also the previously described feed back so that the parts, after the speed change has been made, are restored to a neutral or intermediate condition.

There is likewise supplied a means for regulating or setting the amount of speed droop. At a convenient location, there is disposed a regulator 248 geared to a disk 249 to which an indicator 251 is likewise geared. On the disk 249 is a pin 252 carrying a rod 253 connected by a pivot 254 to the upper end of a rocker lever 256 mounted on a suitable fulcrum 257. The lower end of the rocker lever 256 is joined to a link 258 connected to a roller 259. Also connected to the roller 259 is the lower end of a link 261 pivoted to the lever 243. The roller 259 rides on an inclined plane 263 projecting from one side of a lever 264 mounted on a fulcrum 266. With this arrangement, the angle of the inclined plane 263 is varied as the position of the gate connector 86 changes since the beam 101 transmits its motion through the lever 264 to the inclined plane. The roller 259 is movable right and left (in Figures 1 and 4) as the disk 249 is rotated, but the lever 243 is not displaced laterally since it is adequately anchored.

When the center of the roller 263 is substantially on the center of rotation of the lever 264, the rotation of such lever does not displace the roller 259 in any appreciable amount. However, when the disk 249 has rocked the lever 256 so that the center of the roller 259 is substantially displaced from the axis of rotation of the lever 264, then such rotation of the lever 264 moves the inclined plane 263 and correspondingly lifts or lowers the roller and thus rotates the lever 243 about the pivot connection to the link 241 as a fulcrum. This correspondingly moves the sleeve 28 of the governor speed pilot valve. Consequently, when droop is permitted in the system, the movement of the gate fitting 86 in response to the motion of the gate motor 83 is sent back to move the lever 264 and the lever 243 in such a fashion as to readjust the position of the governor speed pilot valve control sleeve 28 and thus to establish a new speed regulating position. This then permits the speed to change from its 100% rated value as the gate position changes.

In a governor of the high accuracy and sensitivity of the one disclosed herein, friction is an important factor. Since the friction of motion is usually much less than the friction of rest, there are preferably provided means associated with the governor head for repeatedly imparting slight movement to some of the critical governor parts so that very slight governing forces are effective due to the resulting low friction. Conveniently the jarring or vibrating means is largely hydraulic. As especially shown in Figures 2 and 8, pressure fluid from the conduit 26 is transferred through the conductor 54 and 63 to the servo cylinder 63 above the piston 66 whenever the land 52 uncovers the opening 32. I preferably provide a periodic relief of that pressure so that a slight vibration results.

Opening into the space 32 is a passage 271 formed in the sleeve 28 and plugged at its lower end. Intersecting the passage 271 is a port 272 designed to register once each revolution with an aperture 273 passing through the wall of the valve core 17. The aperture 273 opens into the central drain passage 43 of the core 17 and is of considerable axial extent so that the port 272 and the aperture 273 can register despite substantial axial displacement of the sleeve 28 and the core 17. Thus, when high pressure is being transmitted to the servo 62, there is a periodic relief of the pressure to drain and the periodic pressure fluctuation produces a corresponding minute vibration of the parts sufficient to reduce their frictional resistance to movement to a negligible amount.

What is claimed is:

1. A governor comprising a governor casing having a pair of bores therein, a valve sleeve movable in the first of said bores, a valve core movable in said valve sleeve, a fly ball mechanism, means connecting said fly ball mechanism to move said valve core, a hydraulic pump device, a hydraulic servo mechanism having a movable driven member connected to said valve sleeve for moving the same upon actuation of said servo mechanism, a valve spool movable in the second of said bores, means responsive to actuation of said servo mechanism for moving said valve spool, and means including hydraulic passages in said valve core and said valve sleeve and said valve spool for conducting pressure fluid from said pump device to said servo mechanism.

2. A governor comprising a governor casing having a pair of bores therein, a valve sleeve movable in the first of said bores, a valve core movable in said valve sleeve, a fly ball mechanism, means connecting said fly ball mechanism to move said valve core, a hydraulic servo mechanism having a movable driven member, means for connecting said member of said servo mechanism to said valve sleeve, a gate motor, means for interconnecting said gate motor and said servo mechanism whereby actuation of said servo mechanism controls operation of said gate motor, a valve spool movable in the second of said bores, means for moving said valve spool in response to actuation of said gate motor, a hydraulic pump device, and means including hydraulic passages in said valve core and said valve sleeve and said valve spool for conducting pressure fluid from said pump device to said servo mechanism.

3. A governor comprising a governor casing having a bore therein, a valve sleeve movable in said bore, a valve core movable in said valve sleeve, a fly ball mechanism, means connecting said fly ball mechanism to move said valve core, a hydraulic servo mechanism having a movable driven member, means for mechanically connecting said driven member of said servo mechanism to move said valve sleeve, a gate motor, means controlled by said servo mechanism for actuating said gate motor, a valve having a movable valve spool therein, means mechanically connecting said gate motor to move said valve spool, a pump device, and means for hydraulically connecting said pump device to said servo mechanism including hydraulic passages for conducting pressure fluid serially through said valve sleeve and said valve core and around said valve spool.

4. A governor comprising a governor casing having a bore therein, a valve sleeve movable in said bore, a servo mechanism having a movable driven member, means for mechanically connecting said driven member of said servo mechanism and said valve sleeve, a valve core movable in said valve sleeve, a fly ball mechanism, means connecting said fly ball mechanism to move said valve core, a pump device, means for hydraulically interconnecting said pump device and said servo mechanism including hydraulic passages extending through said valve sleeve and said valve core, a gate motor, means controlled by said movable member of said servo mechanism for actuating said gate motor, and means responsive to actuation of said gate motor for controlling hydraulic flow through said hydraulic passages.

5. A governor comprising a governor casing having a bore therein, a valve sleeve movable in said bore, a valve core movable in said sleeve, a fly ball mechanism, means connecting said fly ball mechanism to move said valve core, a hydraulically operated gate motor, means including a passage in said casing controlled by the position of said valve core and said valve sleeve for regulating hydraulic fluid delivered to said gate motor, and means responsive to operation of said gate motor in said passage and for regulating hydraulic fluid delivered to said motor in accordance with the position of said gate motor.

References Cited in the file of this patent

UNITED STATES PATENTS

| 1,375,269 | Akemann | Apr. 19, 1921 |
| 2,106,684 | Ring | Jan. 25, 1938 |
| 2,189,823 | Vickers | Feb. 13, 1940 |
| 2,391,629 | Keller | Dec. 25, 1945 |
| 2,707,938 | Wheeler | May 10, 1955 |

FOREIGN PATENTS

| 442,705 | Great Britain | Feb. 13, 1936 |